Aug. 14, 1928.
P. G. SWARS
1,680,704
TROLLEY FROG
Filed Feb. 19, 1927   2 Sheets-Sheet 1
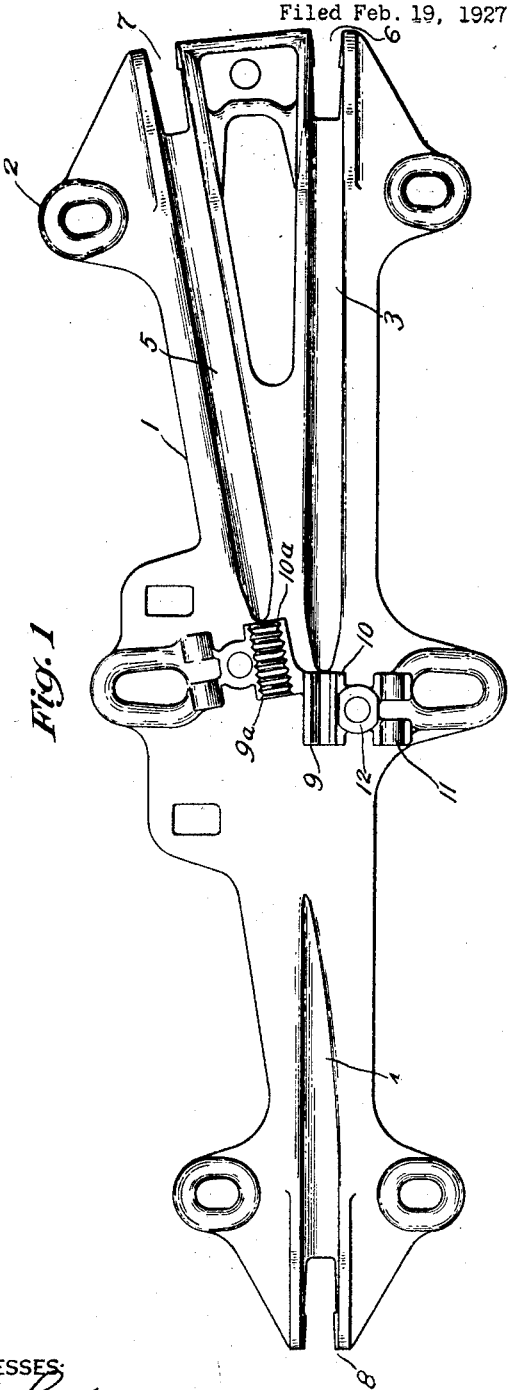
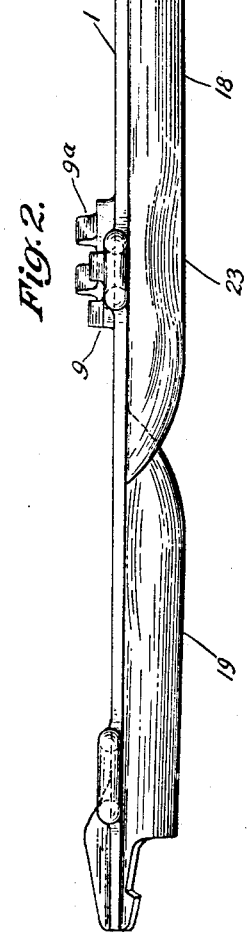
INVENTOR
Paul G. Swars
BY
ATTORNEY Aug. 14, 1928.
P. G. SWARS
1,680,704
TROLLEY FROG
Filed Feb. 19, 1927
2 Sheets-Sheet 2
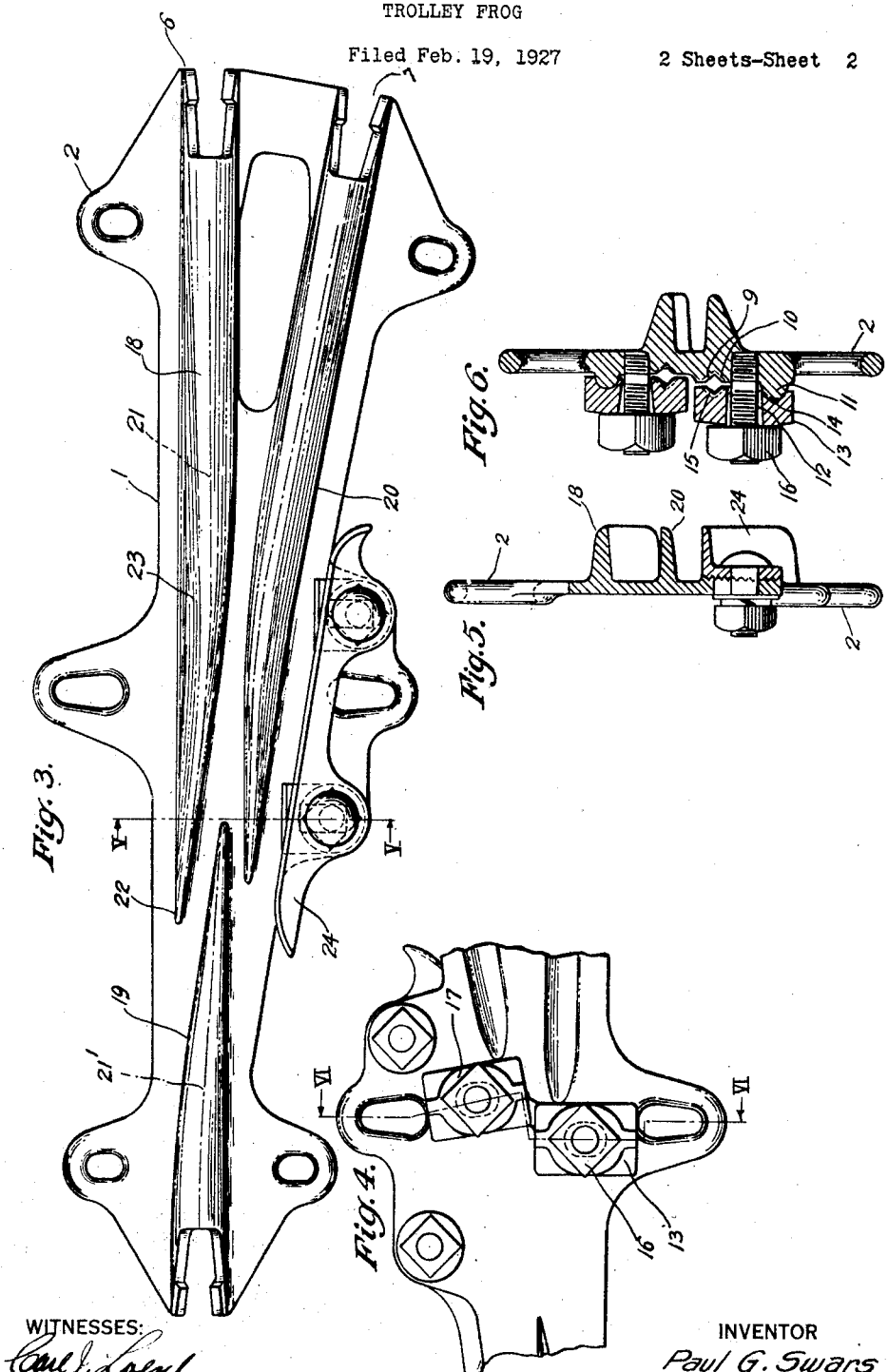
WITNESSES:
INVENTOR
Paul G. Swars
BY
ATTORNEY Patented Aug. 14, 1928.

1,680,704

UNITED STATES PATENT OFFICE.

PAUL G. SWARS, OF PITTSBURGH, PENNSYLVANIA, ASSIGNOR TO WESTINGHOUSE ELECTRIC & MANUFACTURING COMPANY, A CORPORATION OF PENNSYLVANIA.

TROLLEY FROG.

Application filed February 19, 1927. Serial No. 169,513.

My invention relates to trolley frogs, and the like, that are employed in overhead trolley-conductor systems.

One object of my invention is to provide a frog that shall render satisfactory service in overhead trolley-conductor systems in which various sizes and styles of trolley wheels are employed as current collectors.

Another object of my invention is to provide a device of the above-indicated character that may be easily and quickly erected in an operating position.

A further object of my invention is to provide a trolley frog to which a turn-out trolley conductor may be easily secured without interfering with the main-line trolley conductor and from which either the turn-out conductor or the main-line conductor may be easily removed without removing the other conductor.

A still further object of my invention is to provide a trolley frog provided with means for securing trolley conductors thereto in which the clamping members may be reversed end-for-end or be used interchangeably.

Heretofore, it has been customary, in constructing trolley frogs with overlapping runners for use in overhead trolley-conductor systems, to manufacture one form of frog for systems utilizing narrow trolley wheels as collectors and another form for use in systems employing wide trolley wheels. This was found to be advisable because, if a frog provided with overlapping runners and having a narrow slot or cut-away portion between the main-line runner and the turn-out runner was employed in a system using wide trolley wheels, the flanges of the wide wheels would not pass through the narrow slot, but would impinge against the turn-out runner and throw the trolley-pole off or cause undue wear. On the other hand, when a frog provided with a wide slot or cut-away portion between the main-line runner and the turn-out runner was employed in a system using narrow trolley wheels, the flanges of the narrow wheels would not readily pass over the point of the main-line runner when the trolley wheel was switched from the main-line runner to the turn-out runner.

In view of the tendency of trolley wheels, by reason of their inertia when travelling at a fair speed, to follow the true center of a main-line runner, I have discovered that, if the center of the high guiding portion of the main-line runner is shifted from the true center of the runner toward the turn-out runner, the trolley-wheel flange on the side of the guiding portion next to the turn-out runner will hug that side of the guiding portion of the main-line runner and, therefore, will pass through a comparatively narrow opening between the main-line runner and the turn-out runner. I have found this to be true of large wheels as well as small wheels, and I have, therefore, devised a frog in which the side of the main-line runner farther away from the turn-out runner is cut away to some extent and its high guiding portion or high contour line is deflected from the true center of the runner toward the turn-out runner, and in which the high guiding portion, or high contour line, of the turn-out runner is also shifted from the true center of the turn-out runner. It will thus be seen that, where my improvement is used, it is not necessary to provide one style of frog for narrow trolley wheels and another style of frog for wide trolley wheels.

In constructing my improved trolley frog, I have also provided separate means for securing the main-line trolley conductor and the turn-out trolley conductor to the frog, and have placed the fastening means for the turn-out conductor on a plane higher than that on which the fastening means for the main-line conductor is located, so that the end of the turn-out conductor may pass over the main-line conductor without interfering with it in any way.

For a better understanding of my invention, reference may be had to the accompanying drawings, in which:

Fig. 1 is a top plan view of a trolley frog constructed in accordance with my invention;

Fig. 2 is a view, in side elevation, of the trolley frog illustrated in Fig. 1;

Fig. 3 is a bottom plan view of the trolley frog illustrated in Fig. 1;

Fig. 4 is an enlarged top plan view of the central portion of my improved trolley frog, with the clamping members for the trolley conductors shown in operative position;

Fig. 5 is a cross-sectional view taken along the line V—V of Fig. 3; and

Fig. 6 is a sectional view taken along the line VI—VI of Fig. 4.

Referring to the drawings, I have shown a trolley frog having a body member 1 provided with a plurality of eye lugs or loops 2, adapted to receive supporting wires (not shown) when the trolley frog is placed in an operative position. The body member 1 is provided, in its upper side, with alined grooves 3 and 4 that are adapted to receive a main-line trolley conductor (not shown) and it is also provided with a groove 5 located at an angle to the grooves 3 and 4 and adapted to receive a turn-out trolley conductor (not shown).

The body member 1 of the frog is also provided with recesses 6 and 7 at one end and with a recess 8 at its other end to receive the inner ends of approach members. The approach members have not been illustrated as they do not constitute parts of my present invention and are well-known in the art. The type of approach member preferably employed is described and illustrated in Patent No. 1,563,455, issued to the Westinghouse Electric and Manufacturing Company on December 1, 1925, upon an application filed by me.

On the upper side of the trolley frog and near its central portion, I have provided means for clamping a main-line conductor thereto comprising a pair of lips or ridges 9 and 10 adapted to grip the main-line conductor, and a raised portion 11 extending in parallel relation to the lips 9 and 10 and located a short distance therefrom. A stud bolt 12 is secured in the body member 1 between the pair of lips 9 and 10 and the raised portion 11 and is adapted to cooperate with a clamping member 13 provided with ribbed grooves 14 and 15 on its underside that are adapted to bear respectively against the raised portion 11 and a trolley conductor (not shown) when placed in an operative position. The clamping member 13 is secured in such position by a nut 16 on the stud bolt 12. The grooves 14 and 15 in the clamping member 13 are made alike so that the clamping member may be readily secured in position, with either end placed over the trolley conductor.

While the faces of the grooves 14 and 15 of the clamping member 13 are roughened by cross-ribs in order to insure a good gripping contact with the trolley conductor, the lips 9 and 10 on the body of the frog are not provided with ribs or otherwise roughened, as it has been found that, if the main-line trolley conductor is clamped too tightly between ribbed surfaces, such surfaces are likely to have a destructive effect upon it.

I have provided also a similar but separate clamping means 17 near the central portion of the body member 1 for fastening the turn-out trolley conductor thereto, and its clamping lips $9^a$ and $10^a$ have been roughened by cross-ribs in order to make them particularly effective in clamping the turn-out trolley conductor. The clamping means 17 for securing the end of the turn-out trolley conductor has been constructed on a plane above or beyond the plane on which the means for clamping the main-line conductor is placed, so that the end of the turn-out trolley conductor may extend over the main-line conductor without interference, if it is of such a length that it extends beyond the clamping means 17.

The underside of the frog 1 is provided with a runner 18 and a runner 19 that are approximately in alinement with each other to form a main-line runner. A turn-out runner 20 is located in angular relation with the main line runner 18 to act as a guide for a trolley-wheel collector when it is moving to a turn-out or switch track. The tips of the runners overlap, as illustrated.

The high guiding portion or high contour line of the runner 18 does not follow the true center of the runner but is deflected from the true center toward the turn-out runner 20, as shown by the dotted line 21. After the high contour line, as shown by the dotted line 21, leaves the true center of the runner 18 (looking at it from the end corresponding to recess 6 of the body member 1), its direction is changed and it leads across the true center of the runner 18 to a point near the end of the tip 22 thereof. The line of contact of the body of the runner 18 with its base is substantially straight, but a section 23 of the runner is hollowed out near the point where the high guiding portion or contour line 18 most nearly approaches the turn-out runner 20 to assist in shaping the runner so that it will act as a guide for either wide or narrow trolley wheels.

The high guiding portion or high contour line 21' of the main line runner 19 is also deflected from the true center of the runner in the direction of the turn-out runner 20. In considering the aligned runners 18 and 19 as the main-line runner, it will be noted that their high guiding portions or high contour lines are deflected from the true center of the runner toward the turn-out runner 20, as indicated by the dotted lines 21 and 21'. This deflection of the working center or high guiding portion from the true center of the main line runner will cause the inner flanges of the trolley wheels that pass over it in following the main track, at moderate or high speed, to hug the side of the main-line runner adjacent the turn-out runner and thereby cause the flanges of the wheels to follow the narrow passage between the main line runner and the turn-out runner by reason of the fact that the trolley wheel through its inertia will tend to follow a straight path.

When a trolley wheel is operated over the turn-out runner, it will of course be forced to follow the turn-out runner by reason of the leading force exerted upon it by its trolley pole. However, the narrow slot between the main-line runner and the turn-out runner employed in my improved frog will enable either a narrow trolley wheel or a wide trolley wheel to pass to or from the turn-out runner without difficulty.

A guard 24 is also provided on the turn-out side of the trolley frog as an additional means for preventing the trolley wheels from leaving the runners when they pass from the turn-out line to the main line, but, inasmuch as such guards are well known in the art and do not form a part of my invention, a detailed description thereof is believed to be unnecessary.

Various modifications and changes may be made in the device illustrated as embodying my invention without departing from the spirit and scope thereof, and such modifications and changes are intended to be covered by the appended claims.

I claim as my invention:

1. A trolley frog comprising two runners having high guiding portions the top wearing surfaces of which converge toward each other and then diverge from each other in the same plane.

2. A trolley frog comprising a turn-out runner and a main-line runner that is hollowed out on one side of its guiding surface.

3. A trolley frog comprising a body portion, a turn-out runner, and a main-line runner having a base and two contiguous guiding portions extending in different directions, the line of contact of both of said portions with said base being substantially straight and the region of juncture being concave.

4. A trolley frog comprising a plurality of overlapping runners the highest contour line of the guiding portion of each runner being varied laterally from the true center line of the runner.

5. A trolley frog comprising a body member provided with a portion adapted to grip a trolley conductor and having a raised bearing portion, a clamping member having a depression near one end adapted to grip a trolley conductor and provided with a depression near its other end adapted to cooperate with the raised bearing portion on the body member and fastening means passing through the central portion of the clamping member for securing it to the body member.

6. A trolley frog comprising a body member provided with a portion adapted to grip a trolley conductor and having a raised bearing portion, a clamping member having duplicate depressions in its end portions adapted to grip said bearing portion and said trolley conductor, respectively, and fastening means passing through the central portion of the clamping member for securing it to the body member.

7. A trolley frog comprising a body member, means for clamping a through trolley conductor in one plane on said body member and means for clamping a turn-out trolley conductor in another plane on said body member.

8. A trolley frog comprising a body member, means for clamping a through trolley conductor in one plane on the body member and means for clamping a turn-out trolley conductor in a higher plane on said body member to permit the end of said turn-out conductor to extend over said through trolley conductor.

9. A trolley frog comprising a turn-out runner and a main-line runner provided with a substantially straight guiding surface on its side adjacent the turn-out runner and having a concave guiding surface on its side farthest from the turn-out runner.

10. A trolley frog comprising a turn-out runner and a main-line runner, said main-line runner being hollowed out on its side opposite the side on which the turn-out runner is disposed.

11. A trolley frog comprising a turn-out runner and a main-line runner provided with a diagonal slot leading to the turn-out runner and having a cut-away guiding surface on its side farthest from the turn-out runner.

12. A trolley frog comprising a turn-out runner and a diagonally slotted main-line runner, said main-line runner being substantially straight longitudinally on its side adjacent the turn-out runner and curved longitudinally on the opposite side.

13. A trolley frog comprising a turn-out runner and a main-line runner, said main-line runner having its highest contour line varied laterally in the same plane from the true center line of the runner.

In testimony whereof, I have hereunto subscribed my name this 16th day of February, 1927.

PAUL G. SWARS.